United States Patent

Heinz et al.

[11] Patent Number: 6,118,625
[45] Date of Patent: Sep. 12, 2000

[54] MAGNETIC HEAD WITH LATERAL SHIELDING LIMBS AND A COMMON CONTACT FACE

[75] Inventors: Richard Heinz, Mühltal; Hartmut Willmann, Gross-Zimmern, both of Germany

[73] Assignee: U.S. Philips Corporation, New York, N.Y.

[21] Appl. No.: 08/768,683

[22] Filed: Dec. 18, 1996

Related U.S. Application Data

[63] Continuation of application No. 08/567,731, Dec. 5, 1995, abandoned, which is a continuation of application No. 08/236,784, Apr. 29, 1994, abandoned.

[30] Foreign Application Priority Data

May 3, 1993 [DE] Germany ............................. 43 14 423

[51] Int. Cl.[7] ............................. G11B 5/265; G11B 5/17
[52] U.S. Cl. ............................................. 360/121; 360/123
[58] Field of Search .................................... 360/110, 119, 360/121, 122, 123, 124, 125, 127, 128

[56] References Cited

U.S. PATENT DOCUMENTS

| | | | |
|---|---|---|---|
| 2,969,529 | 1/1961 | Gilson . | |
| 3,399,393 | 8/1968 | Chang | 360/119 |
| 3,881,191 | 4/1975 | Potter et al. | 360/121 |
| 3,975,773 | 8/1976 | Dejouhanet et al. | 360/126 |
| 4,816,950 | 3/1989 | Heinz et al. | 360/128 |
| 4,954,921 | 9/1990 | Bolt | 360/121 |
| 5,010,432 | 4/1991 | Fukushima et al. | 360/108 |
| 5,057,957 | 10/1991 | Ito et al. | 360/123 |

FOREIGN PATENT DOCUMENTS

| | | | |
|---|---|---|---|
| 2315713 | 11/1973 | Germany | 360/121 |
| 3226446 | 2/1983 | Germany . | |
| 3622683 | 1/1988 | Germany . | |
| 111320 | 8/1979 | Japan . | |

OTHER PUBLICATIONS

IBM TDB "High Resolution Magnetic Recording Head", H. P. Schlaeppi, vol. 6, No. 2, Jul. 1963 p 68.

IBM TDB "Multigap Recording Head", D.A. Thompson, vol. 12, No. 10, Mar. 1970, p 1555.

*Primary Examiner*—William Klimowicz
*Attorney, Agent, or Firm*—David R. Treacy

[57] ABSTRACT

A magnet-head device for a magnetic-tape apparatus having a rotatably supported head disc carrying magnetic heads (10) at its periphery. A magnetic head has lateral additional limbs (12) which extend into the path of the magnetic tape (14), so that their end faces (12a) form a common contact face with the end face (11a) of the magnetic head (10).

15 Claims, 1 Drawing Sheet

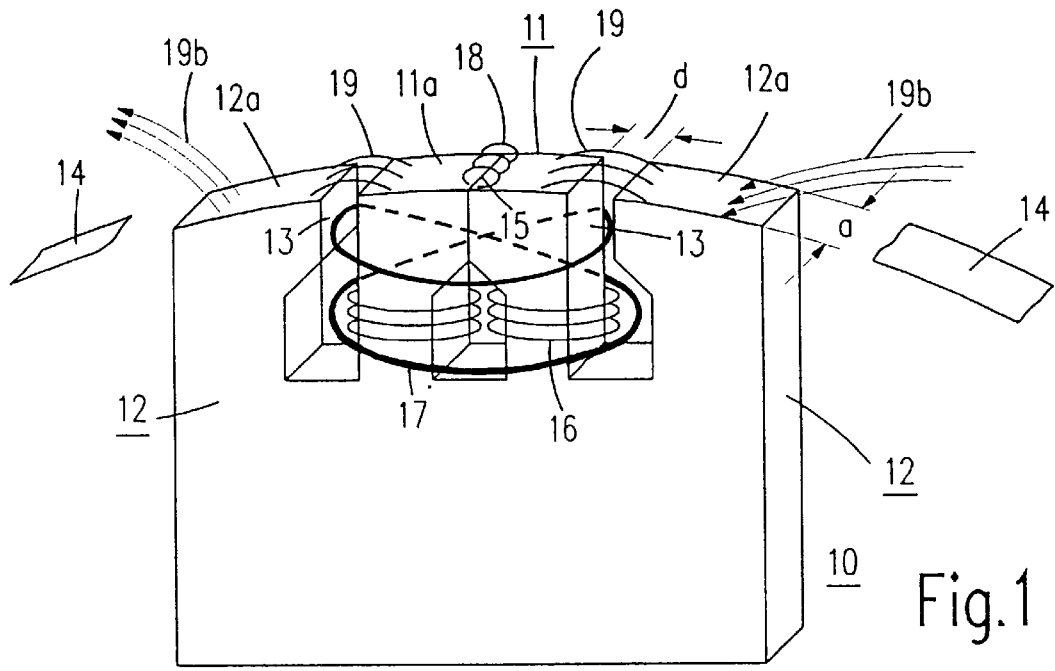
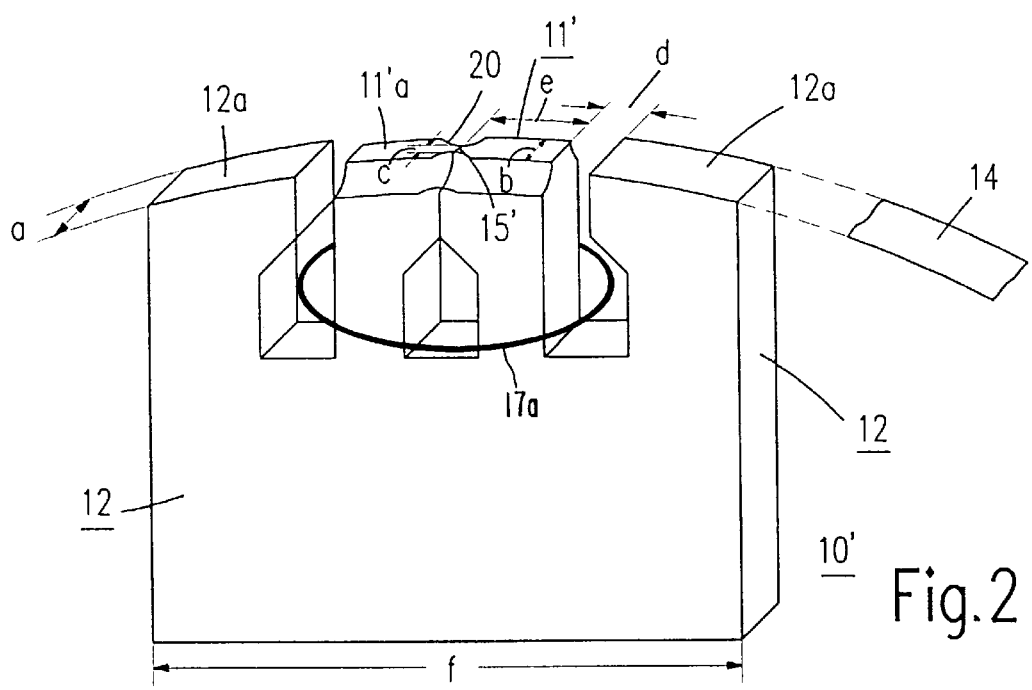
 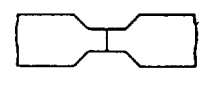 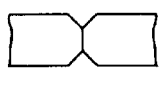 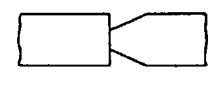

MAGNETIC HEAD WITH LATERAL SHIELDING LIMBS AND A COMMON CONTACT FACE

This application is a continuation of application Ser. No. 08/567,731, filed Dec. 5, 1995, now abandoned, which was a continuation of application Ser. No. 08/236,784, filed Apr. 29, 1994, now abandoned.

BACKGROUND OF THE INVENTION

The invention relates to a magnetic-head device for a magnetic-tape apparatus comprising a rotatably supported head disc carrying magnetic heads at its periphery, which heads each comprise lateral additional limbs disposed so as to form secondary gaps, and the invention also relates to a magnetic head.

A magnetic-tape apparatus is known from, for example, DE-A 36 22 683 (herewith incorporated by reference). This known construction concerns a device for suppressing magnetic crosstalk. In the device said additional limbs are formed by prolonging the head dimensions in the longitudinal direction of the head-face so as to form said secondary gaps. These prolongations form a magnetic shunt for the lines of force emanating from the active gap of the magnetic head. In this known construction the lateral limbs formed as prolongations terminate below the contact face of the magnetic tape, so that there can be no contact with the magnetic tape.

DE-A 32 26 446 (herewith incorporated by reference) discloses a magnetic head arranged inside a shielding case. With this construction crosstalk is reduced in that at least one side of an opening provided in the shielding case for the passage of the magnetic head is bevelled. This bevel may be straight or arcuate and has been provided at those sides which extend substantially perpendicularly to the transport direction of the magnetic recording medium. The shielding case, which has been constructed as a separate part, is not in contact with the magnetic tape.

OBJECTS AND SUMMARY OF THE INVENTION

It is an object of the invention to improve a magnetic head and a magnetic-head device of the type defined in the opening paragraph so as to obtain an improved shielding and efficiency.

According to the invention this is achieved in that the additional limbs extend into the path of the magnetic tape and in that the end faces of the additional limbs form a common contact face with the end face of the magnetic head. This common contact face is formed by portions of a continuously curved surface arranged such that the magnetic tape will contact substantially all of the common contact face. Since the additional limbs arranged at both sides of the magnetic head form an additional contact face for the magnetic tape the active head face of the magnetic head can be very small and, consequently, the width of the main limbs of the magnetic head can be reduced. As experience has shown, this yields an improved efficiency. Thus, the magnetic head in accordance with the invention is not larger than a conventional magnetic head. The large contact face is advantageous in order to minimise sagging (oscillations). Moreover, damping pads to preclude so-called rubbing noise can be fitted simply and effectively. The extended lateral additional limbs form a very effective shunt for spurious flux.

In an embodiment of the invention shunting is optimised in that the secondary gaps are dimensioned in such a manner that there is no appreciable short-circuit of the useful flux but that spurious fields are intercepted in an optimum manner.

A further improvement of the efficiency is achieved in that the end face disposed between the additional limbs is narrowed in a direction transverse to the transport direction of the magnetic tape so as to form a residual contact face. This improves the head/tape contact. This effect can be enhanced in that the residual contact face thus formed has a semicircular constriction at both sides.

In an embodiment of the invention the magnetic head has integral additional limbs. Thus each magnetic head consists of an integral unit, i.e. the active part and the additional limbs which take up the spurious flux. Such a one-piece construction has a positive effect on the mechanical construction, the production costs and the tape guidance.

The magnetic heads may be manufactured by means of a laser technique. By means of such a technique a very simple and cheap production is possible. Moreover there need not be a specific angular relationship between the head gap (in the case of azimuth recording) and the secondary gaps. The magnetic head may be assembled from separate parts, which parts are manufactured, for example, by grinding and are subsequently assembled.

In an embodiment of the invention in addition to the head winding the magnetic head carries a short-circuit winding. Such short-circuit windings promote the effect of the additional limbs which take up the spurious flux. The short-circuit winding is formed by a turn of wire or foil connected by soldering or laser-welding. Alternatively, the short-circuit winding consists of a plurality of turns of wire wound over the head winding and short-circuited. The short-circuit winding may also be a closed ring threaded into the gap.

BRIEF DESCRIPTION OF THE DRAWING

In the drawing:

FIGS. 1 and 2 show diagrammatically two exemplary embodiments of the invention, and FIGS. 3a to 3d show details.

DESCRIPTION OF THE PREFERRED EMBODIMENTS

FIG. 1 shows a magnetic head 10 having an active part 11 and two lateral additional limbs 12 which are integral with the active part 11. The additional limbs 12 each form a secondary gap 13 with the active part 11. The additional limbs 12 extend into the path of a magnetic tape 14, so that their end faces 12a form a common contact face with the end face 11a of the active part. The active part 11 has an active gap 15 and its limbs carry a head winding 16 and a short-circuited winding 17. The numeral 18 refers to a useful flux emanating from the active gap 15, by means of which it is possible, for example, to record on the tape 14. Spurious flux 19 emanating from the end face 11a of the pole shank is absorbed by the lateral additional limbs 12, so that it cannot spread to undesired locations and has no adverse effect.

In the case of a reproducing head the spurious flux 19b from a remote interference source should be intercepted. As a result of the large size of the additional limbs 12 they present a substantially lower reluctance to this spurious flux than the active part 11, so that substantially the entire spurious flux can be directed via the limbs 12 without a spurious signal being generated in the active part 11.

In comparison with that shown in FIG. 1 the embodiment shown in FIG. 2 has been modified in that the active part 11' has been narrowed in a direction transverse to the transport direction of the tape 14. In addition, the active part 11' has been given a semicircular constriction 20 at both sides at the location of the active gap 15' in order to define the track width c. Short-circuit winding 17a is formed by a closed ring threaded into the gap.

The following dimensions for the magnetic heads 10 and 10' are given by way of indication:

a=200 µm, b=60 µm, c=25 µm, d=100 µm, e=600 µm, f=2500 µm, i.e.

for a width of the active gap 15 or 15' of approximately 0.2 µm.

FIGS. 3a to 3d are plan views showing a semicircular, a trapezoidal and two triangular constrictions in the active part 11' shown in FIG. 2.

What is claimed is:

1. A magnetic head having an active part including an active gap defined by a pair of first and second limbs, the first and second limbs having end faces forming a contact face (11a) for a magnetic tape, the magnetic head also having lateral additional limbs (12) disposed so as to form secondary gaps (13) between the active part and the additional limbs, characterized in that the additional limbs (12) have end faces (12a) arranged as additional contact faces which form a common contact face with the end faces of the first and second limbs for contacting the magnetic tape, the common contact face being formed by portions of a continuously curved surface arranged such that the magnetic tape will contact substantially all of the common contact face, the additional limbs and the active part being a single unit of uniform construction and each of the secondary gaps, whereby the end faces of the additional limbs form a shield for spurious flux, and the contact between the magnetic tape and the end faces of the additional limbs minimizes tape oscillations (13) being wider than the active gap.

2. A magnetic head as claimed in claim 1, characterised in that in addition to a head winding (16) the magnetic head (10, 10') carries a short-circuited winding (17).

3. A magnetic head as claimed in claim 2, characterised in that the short-circuited winding (17) is formed by a turn of wire or foil connected by soldering or laser-welding.

4. A magnetic head as claimed in claim 2, characterised in that the short-circuited winding (17) consists of a plurality of turns of wire wound over the head winding (16) and short-circuited.

5. A magnetic head as claimed in claim 2, characterised in that the short-circuited winding (17) is a closed ring threaded into the gap (13).

6. A magnetic-head device for a magnetic-tape apparatus comprising a rotatably supported head disc which at its periphery carries a magnetic head as claimed in claim 1.

7. A magnetic head as claimed in claim 1 characterized in that the secondary gaps (13) are dimensioned in such a manner that there is essentially no short-circuit of flux useful for recording on the magnetic tape but that spurious flux is intercepted in a manner such that no spurious signals are generated in the active part.

8. A magnetic head as claimed in claim 7, characterized in that in addition to a head winding (16) the magnetic head (10, 10') carries a short-circuit winding (17).

9. A magnetic head as claimed in claim 7 characterized in that the magnetic tape has a transport direction parallel to the axis extending along the common contact face and the end faces of the active part (11') are narrowered in a direction transverse to the transport direction of the magnetic tape (14) so as to form residual contact faces (11a).

10. A magnetic head as claimed in claim 1 characterized in that the magnetic tape has a transport direction parallel to the axis extending along the common contact face and the end faces of the active part (11') are narrowered in a direction transverse to the transport direction of the magnetic tape (14) so as to form residual contact faces (11a).

11. A magnetic head as claimed in claim 10, characterized in that in addition to a head winding (16) the magnetic head (10, 10') carries a short-circuit winding (17).

12. A magnetic head as claimed in claim 10 wherein the contact faces (11a) have constrictions at both ends of the location of said active gap included in the active path, said active gap being an air gap.

13. A magnetic head as claimed in claim 12, characterized in that in addition to a head winding (16) the magnetic head (10, 10') carries a short-circuit winding (17).

14. A magnetic head as claimed in claim 12, characterised by a semicircular (20), triangular or trapezoidal constriction.

15. A magnetic head as claimed in claim 14, characterized that in addition to a head winding (16) the magnetic head (10, 10') carries a short-circuit winding (17).

* * * * *